(12) United States Patent
Tomioka

(10) Patent No.: US 7,012,494 B2
(45) Date of Patent: Mar. 14, 2006

(54) MAGNETIZING APPARATUS FOR TONE WHEEL

(75) Inventor: Masanori Tomioka, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 11/033,282

(22) Filed: Jan. 12, 2005

(65) Prior Publication Data

US 2005/0174110 A1 Aug. 11, 2005

(30) Foreign Application Priority Data

Jan. 15, 2004 (JP) .............................. 2004-007846

(51) Int. Cl.
*H01F 7/20* (2006.01)

(52) U.S. Cl. ..................................................... 335/284

(58) Field of Classification Search ........ 335/210–214, 335/284, 296–298; 313/440
See application file for complete search history.

(56) References Cited

U.S. PATENT DOCUMENTS 5,852,393 A * 12/1998 Reznik et al. .............. 335/284

* cited by examiner

*Primary Examiner*—Ramon M. Barrera
(74) *Attorney, Agent, or Firm*—Bacon & Thomas

(57) ABSTRACT

A magnetizing apparatus for tone wheel, comprising a ring-like magnetizing yoke provided with plural wire inserting grooves at a space in its radial direction, and a wire fixed to the magnetizing yoke by sequentially inserting in the grooves, the wire being inserted into each of the grooves adjacent in a manner that it is disposed by turn in and out side of the wheel. The groove is formed as a bent groove comprised of a first groove provided on a ring-like plane of the magnetizing yoke in its radial direction and of a second groove communicating with the first groove and formed on the peripheral face of the magnetizing yoke.

4 Claims, 13 Drawing Sheets sectional view in the arrow X

MAGNETIZING APPARATUS FOR TONE WHEEL

FIELD OF THE INVENTION

The present invention relates to a magnetizing apparatus for tone wheel, more particularly to a magnetizing apparatus for magnetizing a tone wheel for detecting the rotational velocity used for ABS (Anti Lock Brake System) of automobile.

PRIOR ART

The tone wheel is a ring-like magnetic body attached to the rotating wheel side of tires of automobile and constitutes an encoder for detecting the rotational velocity together with a magnetic sensor attached to the fixed side. For attaching the tone wheel to the rotating member, mainly used is a seal provided for a bearing unit rotatably supporting a wheel hub.

Sealing member with a seal lip is internally fitted into the fixed side such as an outer ring, a ring-like core material with L-shaped section to which the seal lip contacts is externally fitted into the rotating member such as an inner ring, and a combination seal is constructed for a bearing unit. A ring-like tone wheel is attached on the outer face of the core material with an attaching means, so that such a structure has adequate strength and is rational without using an exclusive attaching member. Such an example is disclosed in JP-A-2002-62305.

FIG. 3 is a diagrammatical view of the same tone wheel as disclosed in the above-mentioned prior art and the tone wheel 21 is formed like a ring and is made of a magnetic rubber magnetized in such a manner that the south pole and the north pole are alternately arranged every equal space around its circumference. Namely, the tone wheel 21 is formed of a circular-ring magnetic rubber including magnetic powder such as ferrite and its magnetizing direction is alternate every equal space around its circumference. The tone wheel itself lacks strength and rigidity because it is made of a magnetic rubber, so that it is integrated with a support member having enough strength such as a core material.

A magnetizing apparatus for tone wheel is used for magnetizing the tone wheel as mentioned above. FIG. 13 and FIG. 14 show a magnetizing apparatus for tone wheel according to the prior art. Magnetizing apparatus B for tone wheel in these figures is comprised of a magnetizing yoke 101 formed like a flat ring with a rectangular section and a wire 102 fixed in zigzag and is provided with a DC power source 108 and an ON-OFF switch 109 which are connected at both ends of the wire 102 to constitute a circuit.

Ring-like plane 104 of the magnetizing yoke 101 is provided with plural grooves 103 for inserting a wire, which is formed along the diameter with an even space in the circumferential direction. The inserting directions of the wire 102 are arranged so as to be opposite in the grooves adjacent in the circumferential direction. Therefore, when a fixed amount of electric current is supplied to both ends of the wire 102, a magnetic field is generated around the wire 102 inserted in the groove 103 and the polarities of magnetizing faces that face each other beyond the groove 102 are alternated. That is, when one magnetizing face becomes N pole, the other magnetizing face becomes S pole.

As shown in FIG. 14, the magnetizing yoke 101 is aligned with an annular magnetic rubber which is integrated with a core material 110 so as to prepare to get in touch with the ring-like plane 104, and the electricity is supplied to the wire 102, thereby obtaining a tone wheel 21 in which the S pole and the N pole are magnetized alternately in the circumferential direction and with an even space because of the magnetic filed generated by the wire 102 as shown in FIG. 3. Example of such a tone wheel is disclosed in JP-A-10-115628.

Incorporating the tone wheel into the seal, there are many types of seals corresponding to the type of automobile or the ABS or TSC (Traction Control System) provided for the automobile and several kinds of tone wheel are prepared accordingly. When the tone wheel 21 is attached to the core material 105 as shown in FIG. 15, the fitting tubular portion 105a to be externally fitted into the rotation axis may be bent into the tone wheel attached side against the ring-like portion 105b according to the structure of seal or bearing unit.

When the tone wheel 21 is formed by magnetizing the annular magnetic rubber, the magnetizing yoke 101 is fitted in the fitting tubular portion 105a to be subjected to electricity in order that the ring-like plane 104 gets in touch with the annular magnetic rubber as shown in FIG. 16. The wire 102 inserted in the groove 103 is bent at the outer circumference and the inner circumference of the magnetizing yoke 101 so as to be inserted in the adjacent groove 103. Therefore, as the space for bending the wire 102, the space d is required to be provided in the diameter direction between the outer circumference 106 (or inner circumference 107) of the magnetizing yoke 101 and the fitting tubular part 105a.

Accordingly, the largest diameter (or the smallest diameter) of the tone wheel 21 must be the value which is apart from the distance d from the fitting tubular part 105a, so that the length of the tone wheel 21 in the diameter direction, namely the magnetizing area, is limited, thereby being disadvantage for sensing. Such a problem may be caused when the core material attached with the tone wheel as a fitting tubular portion exists in the outer diameter side of the ring-like portion, which is not shown in the figure.

Tone wheel 21 maybe tubular as shown in FIG. 18. The magnetizing apparatus B for magnetizing such a tone wheel may be formed such that plural grooves 103 along the axial direction are provided for the inner circumference of the ring-like magnetizing yoke 101 and the wire 102 is inserted and fixed in the groove 103. In this case, there exists a problem such that the bent portion of the wire 102 protrudes larger than the thickness (ring-like plane) of the magnetizing yoke 101.

As shown in JP-A-10-115628 (refer to FIG. 1 and FIG. 2), if the magnetizing yoke is constructed in such a manner that the part fixed with the wire is reduced so as to have a step, the space for the wire is not required to be considered. However, there needs a complex process to form a step on the magnetizing yoke, thereby increasing the cost. Further, the wire is fixed only in the recessed portion of the magnetizing face, so that it is not preferable considering the magnetizing efficiency. Therefore, such a prior art has a room for improvement as the magnetizing apparatus for tone wheel.

SUMMARY OF THE INVENTION

The object of the present invention is to provide a magnetizing apparatus for tone wheel in which the amount of protruding wire from the magnetizing face of the magnetizing yoke is reduced by devising the shape of the magnetizing yoke and the magnetizing area of tone wheel is increased without modifying or remodeling the support member of the tone wheel such as the core material.

According to one aspect of the present invention, a magnetizing apparatus for tone wheel is comprised of a ring-like magnetizing yoke provided with plural wire inserting grooves at a space in its radial direction, and a wire fixed to the magnetizing yoke by sequentially inserting the grooves, the wire being inserted into each of the grooves adjacent in a manner that it is disposed by turn in and out side of the wheel. The groove is formed as a bent groove comprised of a first groove provided on a ring-like plane of the magnetizing yoke in its radial direction and of a second groove communicating with the first groove and formed on the peripheral face of the magnetizing yoke.

According to other aspect of the present invention, the wire is fixed in zigzag to the first groove and the second groove, and a magnetizing face formed between each of the grooves adjacent is formed of two faces; a part of the ring-like plane and a part of the peripheral face.

Further according to other aspect of the present invention, the angle of the ring-like plane relative to the peripheral face is substantially right.

Still further according to other aspect of the present invention, the angle of the ring-like plane relative to the peripheral face is substantially obtuse.

According to the above-mentioned structure of the one aspect of the present invention, the bent groove has two parts, a first groove and a second groove communicating with each other wherein the former is formed on a ring-like plane in the radial direction of the yoke, whereas the latter is formed on the peripheral face in the axial direction of the yoke, and the wire is inserted in the bent groove. The wire is contained in the second groove at the end of circumferential side, where the second groove is formed, of the end of the first groove, so that the wire cannot protrude in the diameter direction from the end.

Even when the tone wheel is fixed to the core material of which fitting tubular portion is bent against the ring-like portion into where the tone wheel is attached (see FIG. 5), the ring-like plane can be aligned with the tone wheel while fitting the magnetizing yoke into the fitting tubular portion without any clearance, thereby enlarging the width of the tone wheel to obtain a large magnetizing area. As the result, the magnetizing apparatus for tone wheel in which the sensing accuracy of detecting the rotational velocity is improved is provided without accompanying modification of the composite members which are the object to be magnetized such as the core material.

According to the above-mentioned structure of the other aspect of the present invention, the wire is inserted through the first groove and the second groove and the magnetizing face formed between the adjacent grooves is formed of two faces; a part of the ring-like plane and a part of the peripheral face. In case of the tone wheel with a two-dimensional face which is different from the flat plane like a L-shaped section, two different faces can be effectively magnetized at the same time.

The part of the ring-like plane and the part of the peripheral face between the first and second grooves adjacent constitute a magnetizing face for the tone wheel.

According to the above-mentioned structure of the further aspect of the present invention, the angle of the ring-like plane relative to the peripheral face is substantially right. Such a structure is effective for magnetizing the tone wheel which is attached to the core material bent like a letter L (see FIG. 5). In case of using the tone wheel comprised of two different faces, the magnetizing apparatus for tone wheel suitable for the shape of a mainly adopted tone wheel can be provided.

In the embodiment, such ring-like plane crosses the peripheral face of the yoke at a substantially right angle.

According to the above-mentioned structure of the still further aspect of the present invention, the angle of the ring-like plane relative to the peripheral face is substantially obtuse. In case of the tone wheel of which outer circumference is inclined so as to be a part of circular cone (see FIG. 11) and the sensing face is bent, the magnetizing apparatus for tone wheel capable of magnetizing the tone wheel having such a bent sensing face easily and efficiently is provided.

In the embodiment, such ring-like plane crosses the peripheral face at a substantially obtuse angle.

BRIEF DESCRIPTION OF THE DRAWINGS

FIG. 17 shows a magnetizing yoke and a wire for a tubular tone wheel according to the prior art.

DETAILED DESCRIPTION OF THE INVENTION

Now the preferred embodiments of the present invention are explained according to the attached drawings. First explained is a structure sample of a typical rotational velocity detection system in which a tone wheel is incorporated.

Figure 1:
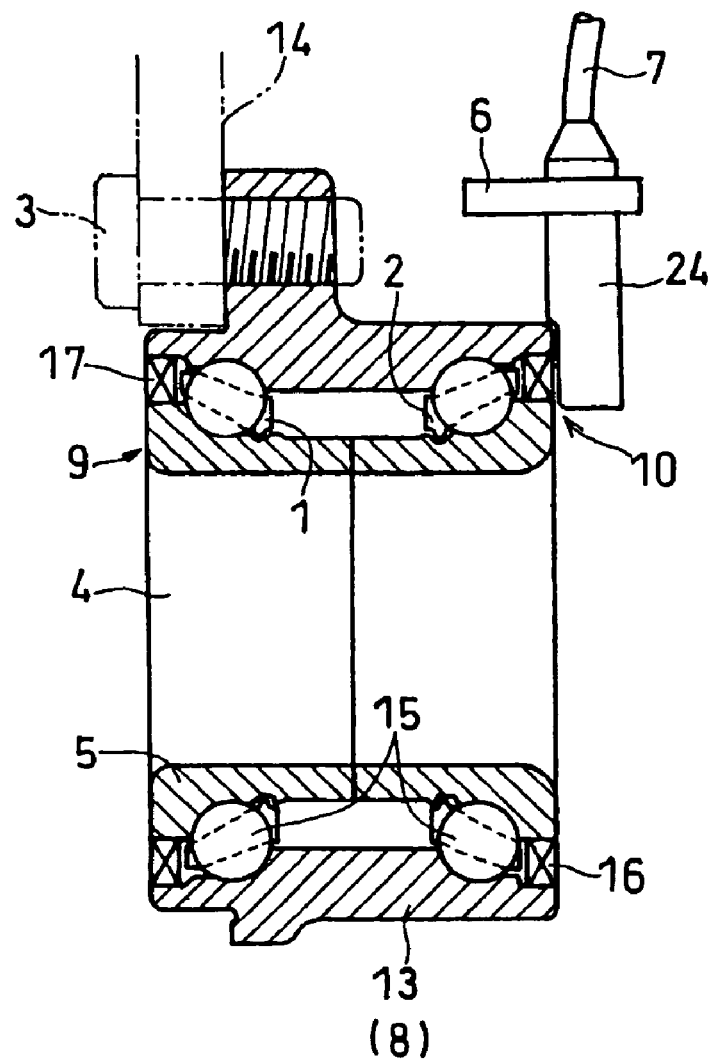
FIG. 1 is a sectional view showing a wheel bearing and therearound.
Figure 2:
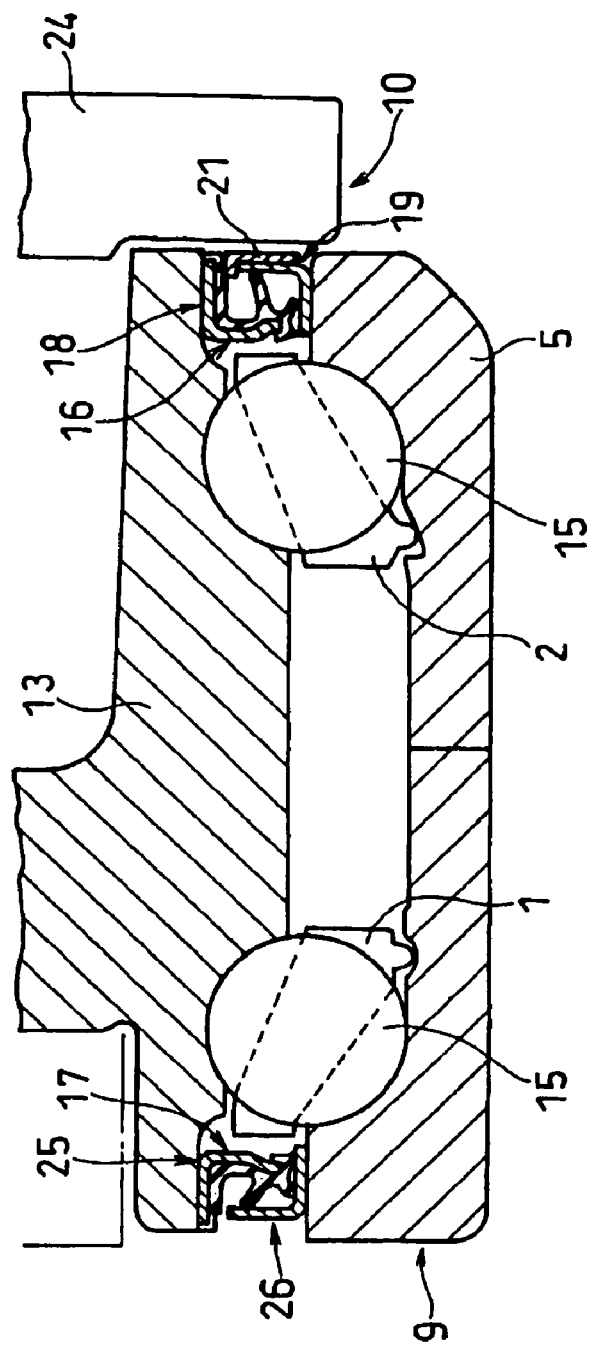
FIG. 2 is an enlarged view of a bearing and a seal ring.

FIG. 1 shows an angular type bearing (shaft bearing) 9 rotatably supporting a driving wheel such as the wheel of automobiles and the surrounding structure. FIG. 2 shows an enlarged section of the bearing 9, an inner seal ring 16 and an outer seal ring 17 which are incorporated into the bearing 9.

The bearing 9 is constructed so as to rotatably support an inner ring 5 which constitutes a wheel and is internally fitted with a hub (not shown) being a rotating side against a hub carrier 8 being a non-rotating side. The bearing 9 is comprised of an outer ring 13 which is a part of the hub carrier 8, the inner ring 5, balls (rolling elements) 15 with two rows at right and left provided between the outer ring 13 and the inner ring 5, and retainers 1, 2 for arranging these balls 15 at an even space in the circumferential direction.

An inner seal ring 16, which is comprised of a pair of a seal ring 18 at a fixed side and a seal ring 19 at a rotary side, is provided between both ends of the outer ring 13 and the inner ring 5 at the inner side (of the automobiles) in the right and left direction on FIG. 2. An outer seal ring 17, which is comprised of a pair of a seal ring 25 at a fixed side and a seal ring 26 at a rotary side, is provided between the other ends of the outer ring 13 and the inner ring 5 at the outer side (of the automobiles) in the right and left direction on FIG. 2.

The reference numeral 3 is a tap-end stud for attaching and fixing the hub carrier 8 constituting the outer ring 13 to a support member 14 at the vehicle body side and plural studs are provided every even space in the circumferential direction. Insertion hole 4 is formed at the center of the inner ring 5 to insert the above-mentioned hub or the axis of a constant velocity joint. The inner seal ring 16 and the outer seal ring 17 prevent outflow of lubricant oil such as grease filled in the ball member 15, or intrusion of dust such as dirt and foreign matter from outside into the ball member 15.

Magnetic sensor 24 fixed to the hub carrier 8 via an attachment stay 6 is disposed close to the side of the inner seal ring 16. Encoder 10 capable of detecting the rotation number of wheel, namely of the inner ring 5, per a unit time is comprised of this magnetic sensor 24 and a tone wheel 21 provided for the inner seal ring 16. The reference numeral 7 indicates a lead wire connected to the magnetic sensor 24.

The inner seal ring 16 is a combination seal ring with a tone wheel, which is comprised of the seal ring 18 at a fixed side that is internally fitted in the inner end of the outer ring 13 and the seal ring 19 fixed at a rotary side that is externally fitted in the inner end of the inner ring 15, between the inner end of the outer ring 13 and the inner end of the inner ring 15.

The seal ring 19 at a rotary side is made of a metal plate such as rolled steel products or a stainless steel and forms an annular slinger 20 with an L-shaped section externally fitted onto the end of the inner ring 5 and the tone wheel 21 which is fitted into the slinger 20 to be supported. The slinger 20 is formed of a fitting tubular portion 20a fitted into the inner ring 5 and a first vertical wall 20b bent from one end (the right end in FIG. 2) of the fitting tubular portion 20a into the seal ring 18 at a fixed side (into the outer ring 13).

The tone wheel 21 detects the relative rotational number of the seal ring 18 at a fixed side and the seal ring 19 at a rotary side. The tone wheel 21 is formed so as to get over the first vertical wall 20b and is attached with adhesion onto the outer surface (the right side in FIG. 2) of the first vertical wall 20b. The tone wheel 21 is comprised of the largest diameter portion 21a outside of the first vertical wall 20b and a stopper portion 21b which slightly comes into the back of the first vertical wall 20b (the left side in FIG. 2) so as to be shaped like a ring with a hook-like section.

Figure 3:
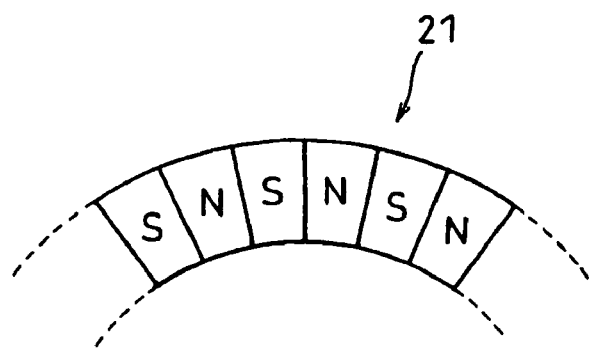
FIG. 3 is a partial side view of a tone wheel.

As shown in FIG. 3, the tone wheel 21 is made of a magnetic rubber magnetized in such a manner that the south pole and the north pole are alternately arranged every equal space around its circumference. Namely, the tone wheel 21 is formed of a circular-ring magnetic rubber including magnetic powder such as ferrite and its magnetizing direction is alternate every equal space around its circumference. The tone wheel 21 made of a magnetic rubber is integrated into the slinger 20 with an adhesion as mentioned above.

The seal ring 18 at a fixed side is comprised of an outer annular core member 22 with an L-shaped section and a sealing member 23 made of rubber. The outer core member 22 is formed of a fitting tubular portion 22a fitted in the inner circumference of the outer ring 13 with pressure and a second vertical wall 22b inwardly bent from the axial end of the fitting tubular portion 22a (the left end in FIG. 4). The end of the second vertical wall 22b is bent so as to be slightly close to the inside (into the right in FIG. 4).

Figure 4:
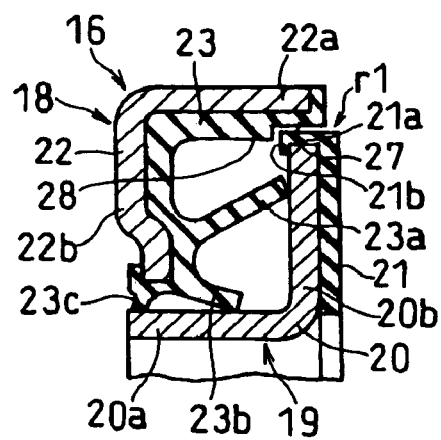
FIG. 4 is an enlarged view of an inner seal portion.

The sealing member 23 is attached to the whole inner face of the outer core member 22 and has plural seal lips 23a, 23b, 23c at one or plural parts (3 in the figure). The first seal lip 23a (side lip) is pressed with the first vertical wall 20b to be contacted and the second seal lip 23b (main lip) and the third seal lip 23c (grease lip) are pressed with the fitting tubular portion 20a to be contacted. The sealing member 23 is generally formed with a rubber material combined with the core member 22 by baking. In FIG. 4, the sealing member 23 is formed of a tip end 27 and a tip portion 28 so as to have a labyrinth r1 between the tone wheel 21, however, such a labyrinth is not always necessary.

The outer seal ring 17 is basically comprised of the same members as those for the inner seal ring 16 except for the tone wheel 21. Namely, the outer seal ring 17 is comprised of a seal ring 26 at a rotary side comprised of only an inner core material 20, a seal ring 25 at a fixed side which is the same as the seal ring 18 at a fixed side of the inner seal ring 16 and so on.

[Embodiment 1]

Magnetizing apparatus for magnetizing the above-mentioned tone wheel 21 is explained referring to FIG. 5–FIG. 9.

Magnetizing apparatus for tone wheel A as shown in FIG. 5–FIG. 9 is comprised of a ring-like magnetizing yoke 31 provided with plural grooves 30 for inserting wires with a space in the circumferential direction, a wire 32 inserted in each groove in order arranged in the circumferential direction to be fixed around the yoke 31, a DC power source 33 (not shown), and a switch 34 (not shown). The inserted direction of the wire 32 is reversed each other in the grooves 30 adjacent in the circumferential direction.

The groove 30 is formed like a bent groove (bent at 90 degrees) which is comprised of a diameter groove 30a (one embodiment of a first groove) formed along the radial direction on a ring-like plane 35 of the magnetizing yoke 31 and a cross groove 30b (one embodiment of a second groove) formed in the direction (axial direction) crossing a peripheral face 36 so as to communicate with the first groove 30a. The wire 32 formed by coating with an insulation material on the surface of an electric wire is inserted through both the diameter groove 30a and the cross groove 30b. The magnetizing face formed between the adjacent grooves 30a, 30b is formed of two faces, namely a first magnetizing face T1 which is a part of the ring-like plane 35 and a second magnetizing face T2 which is a part of the peripheral face 36.

Figure 7:
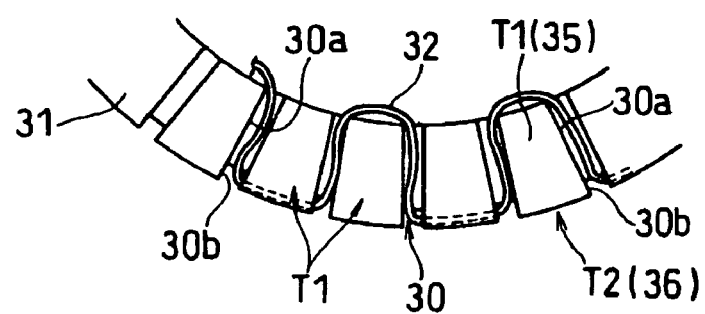
FIG. 7 is a partial plan view of a magnetizing yoke showing the relation of a wire and a groove.
Figure 8:
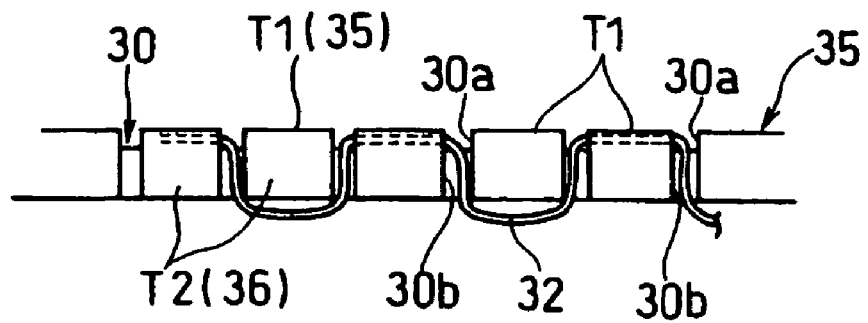
FIG. 8 is a partial plan view of a magnetizing yoke showing the relation of a wire and a groove.
Figure 9:
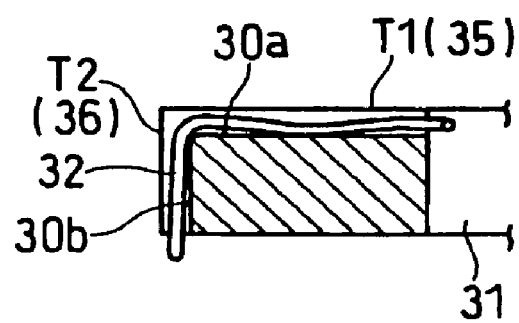
FIG. 9 is a partial section showing the shape of groove.

The wire 32 is inserted in the grooves 30 such that it is bent at a protruding portion into the inner circumference from the diameter groove 30a and at a protruding portion in the axial direction opposite to the diameter groove 30a from the cross groove 30b to be inserted in the next groove 30. As shown in FIG. 7, the wire 32 is fixed in zigzag to the magnetizing yoke 31. Plural wires 32 are practically inserted in the grooves 30 as shown in FIG. 5, however, one of them is shown in FIG. 7–FIG. 9 for easy understanding.

Figure 5:
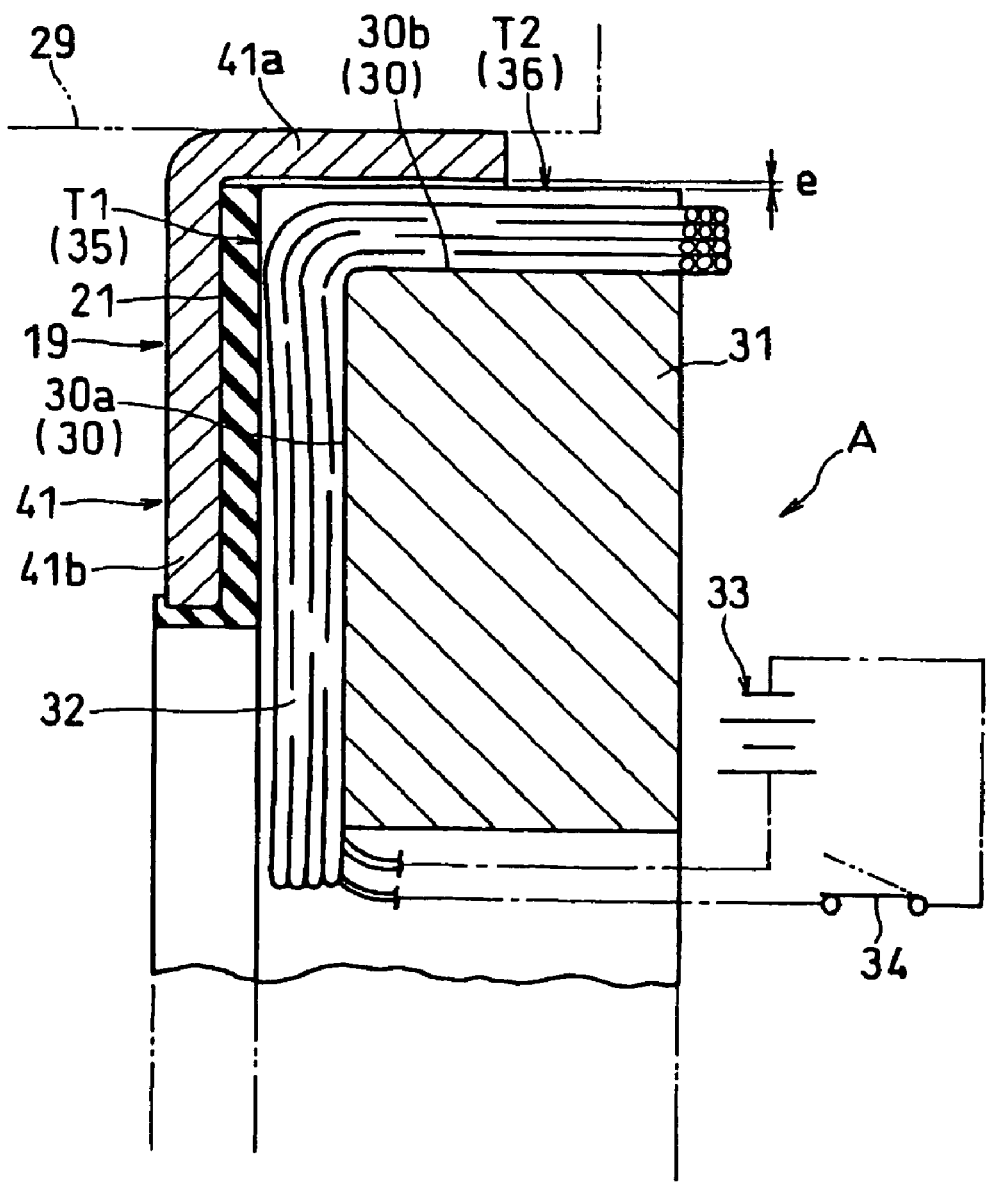
FIG. 5 is a section showing a magnetizing apparatus for tone wheel and its magnetizing condition (embodiment 1).
Figure 6:
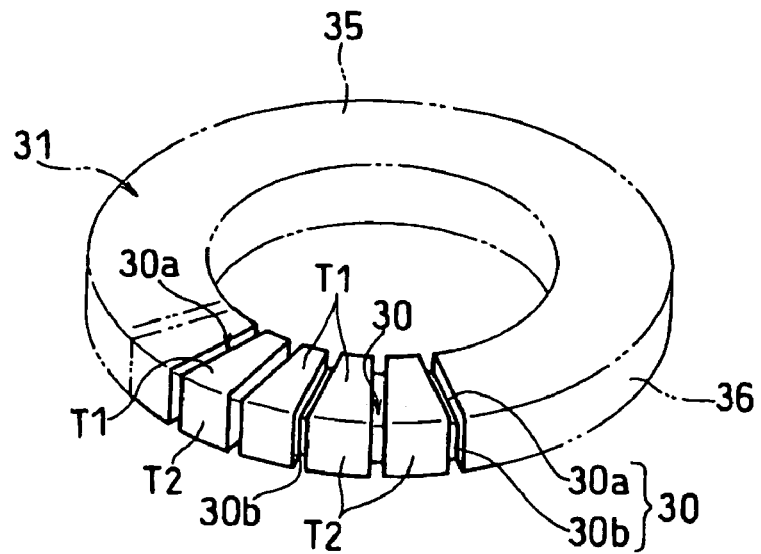
FIG. 6 is a perspective view showing a structure of a magnetizing yoke.

Seal ring 19 at a rotary side shown in FIG. 5 has a different shape from the one shown in FIG. 1, FIG. 2 and FIG. 4. The seal ring 19 is comprised of a core material 41 formed with a fitting tubular portion 41a to be internally fitted into an outer ring 29 at a rotary side and a ring-like vertical wall 41b and a ring-like tone wheel 21 attached to the tubular portion 41a side of the vertical wall 41b. For magnetizing an annular magnetic rubber into the tone wheel 21, the magnetizing yoke 31 is fitted into the fitting tubular portion 41a to make the first magnetizing face T1 contact with the annular magnetic rubber.

Figure 16:
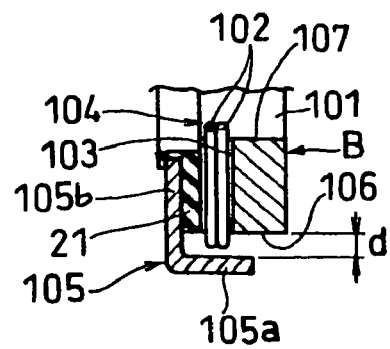
FIG. 16 is a partial section showing how the tone wheel in FIG. 15 is magnetized.
Figure 17A:
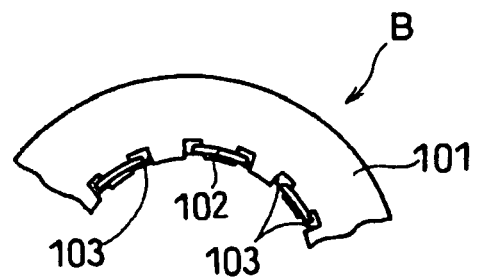
FIG. 17a is its partial plan view and FIG. 17b is its partial side view.
Figure 17B:
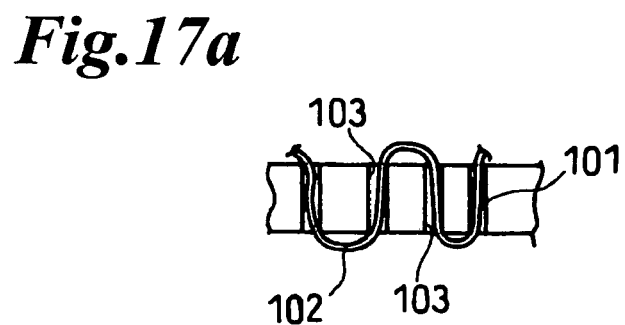

The wire 32 can be fixed into the bent groove 30 without protruding from each one of the magnetizing faces T1, T2, so that the second magnetizing face T2 can be close to the fitting tubular portion 41a of the core material 41 so as to touch each other as shown in FIG. 5. Therefore, the outer diameter of tone wheel 21 can be made large so as to be almost the same as the inner diameter of the fitting tubular portion 41a. Namely, the distance e between the outer circumference of the magnetizing yoke 31 and the inner circumference of the fitting tubular portion 41a is made nearly zero. That is, the distance d in the prior art shown in FIG. 16 and the distance e according to the present invention is in a relation of e<d.

Accordingly, the area of tone wheel 21 is increased accompanied by enlarging the diameter without making the diameter of the seal ring 19 at a rotary side large, thereby contributing to improve the sensing accuracy of detecting rotational number. Further, the wire 32 is fixed by inserting in the groove 30 formed on each face 35, 36 at a contacting side of the tone wheel on the magnetizing yoke 31, so that the wire 32 is close to the annular magnetic rubber as far as possible so as to touch each other under magnetizing process, thereby keeping a desirable magnetizing efficiency. The angle formed with the ring-like plane 35 and the peripheral face 36 is substantially right.

[Embodiment 2]

Figure 10A:
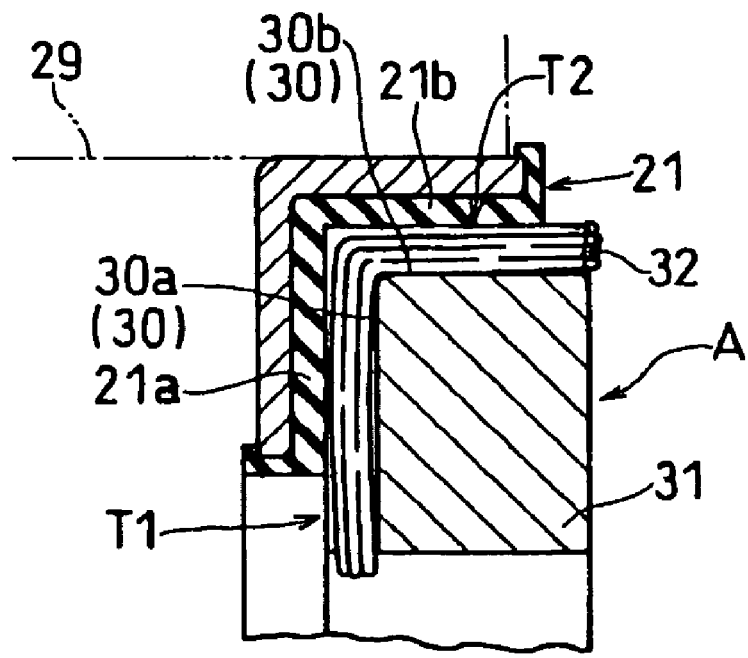
FIG. 10a is a section showing how a tone wheel with an inwardly bent section is magnetized and FIG. 10b is a perspective view of a tone wheel with an outwardly bent section (embodiment 2).
Figure 10B:
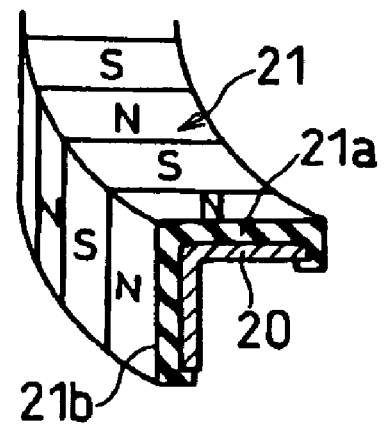

According to the magnetizing apparatus A for tone wheel shown in FIG. 5–FIG. 9, the magnetizing faces T1, T2 exist on different faces. Utilizing such a structure, if the tone wheel 21 has an L-shaped section with inwardly bent portions, comprised of a ring-like portion 21a and a fitting tubular portion 21b as shown in FIG. 10a, both portions 21a, 21b can be magnetized at the same time. On the other hand, if a magnetizing apparatus with a magnetizing yoke having a substantially L-shaped section (not shown) is used, the ring-like portion 21a and the fitting tubular portion 21b are able to be magnetized at the same time in case that the tone wheel 21 has an L-shaped section with outwardly bent portions of which inner circumference the core material 20 is integrally attached.

The ring-like portion 21a contacts with the first magnetizing face T1 and the fitting tubular portion 21b contacts with the second magnetizing face T2 without any spaces respectively, so that two faces can be magnetized at the same time by turning on electricity. The bent parts of the wire 32 are arranged so as to protrude from each groove 30a, 30b, therefore, they do not cause any interference with the first magnetizing face T1 and the second magnetizing face T2. The same members as those in FIG. 5 have the same reference numerals.

[Embodiment 3]

Figure 11:
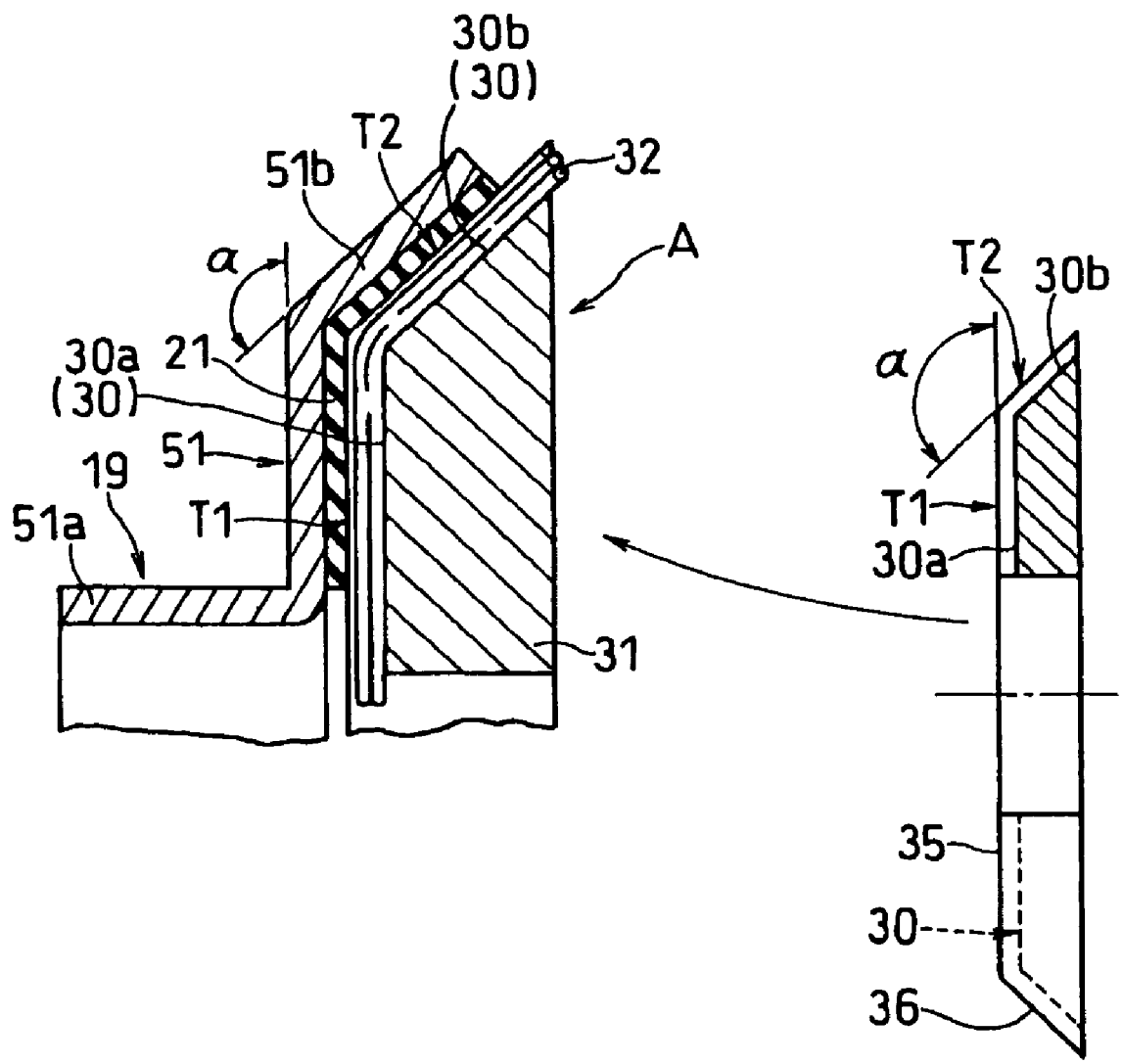
FIG. 11 is a sectional view of a magnetizing apparatus for tone wheel and how it is magnetized (embodiment 3).

The magnetizing apparatus for tone wheel A may be constructed such that the angle of the peripheral face 36 relative to the ring-like plane 35 is set to be a substantially obtuse angle α as shown in FIG. 11. The peripheral face 36 is an inclined plane (a part of conical face) having 135 degrees against the ring-like plane 35 and the angle of the diameter groove 30a relative to the cross groove 30b is 135 degrees. In this case, the protruding parts of the wire 32 in the longitudinal direction of the groove from the first magnetizing face T1 and the second magnetizing face T2, being an inclined plane, which are formed by bending the wire 32, do not cause interference to the seal ring 19 at a rotary side.

Depending on the structure and shape of the rotational velocity detection part, a core material 51 may be shaped such that a vertical wall 51b provided on a fitting tubular portion 51a is bent at 135 degrees (obtuse angle α) or the seal ring 19 at a rotary side may be comprised of the tone wheel 21 bent like the core material 51, as shown in FIG. 11. The magnetizing apparatus A is suitable for magnetizing such a tone wheel 21 having a bent section. The bent angle is not limited to 135 degrees, it may be 120 degrees or 150 degrees, and any obtuse angle is acceptable.

[Embodiment 4]

Figure 12:
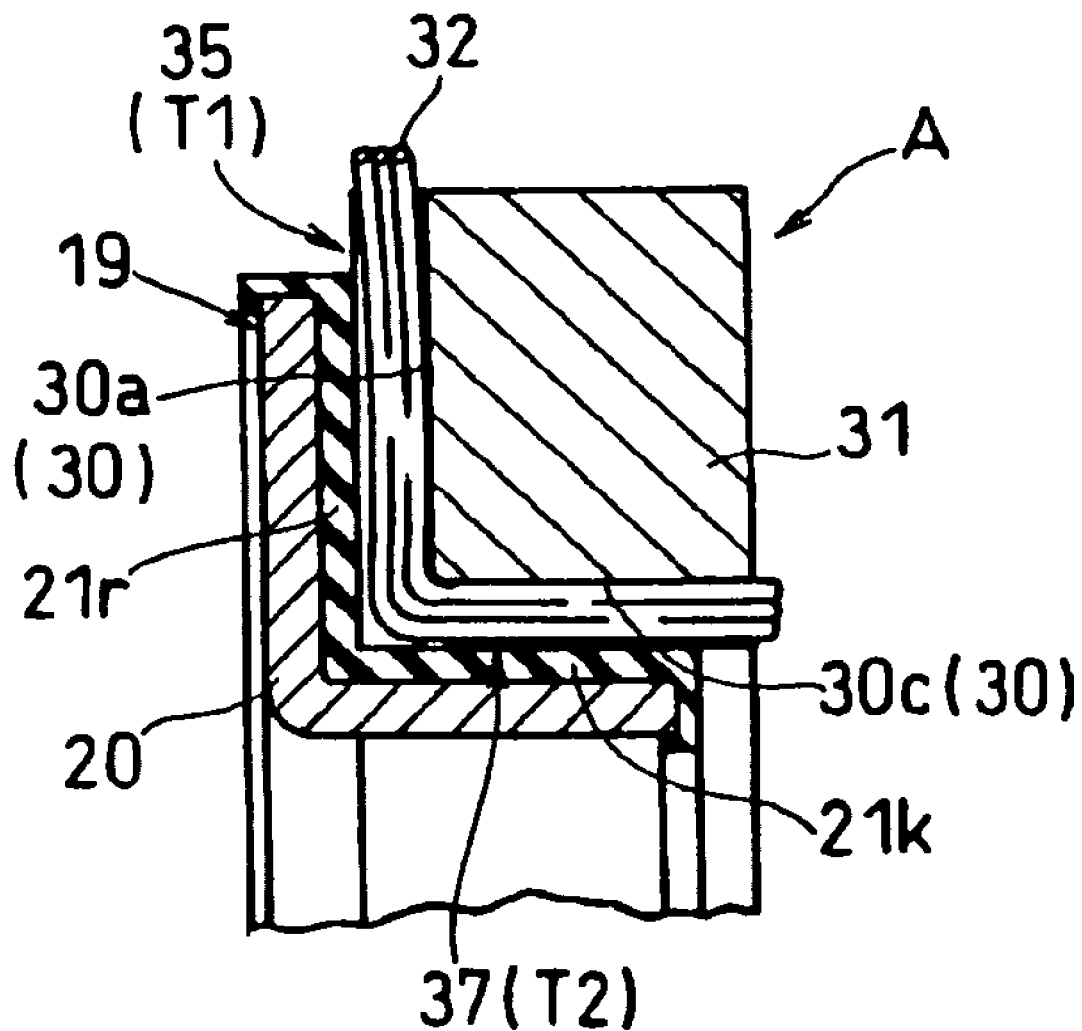
FIG. 12 is a sectional view of a magnetizing apparatus for tone wheel and how it is magnetized (embodiment 4).
Figure 13A:
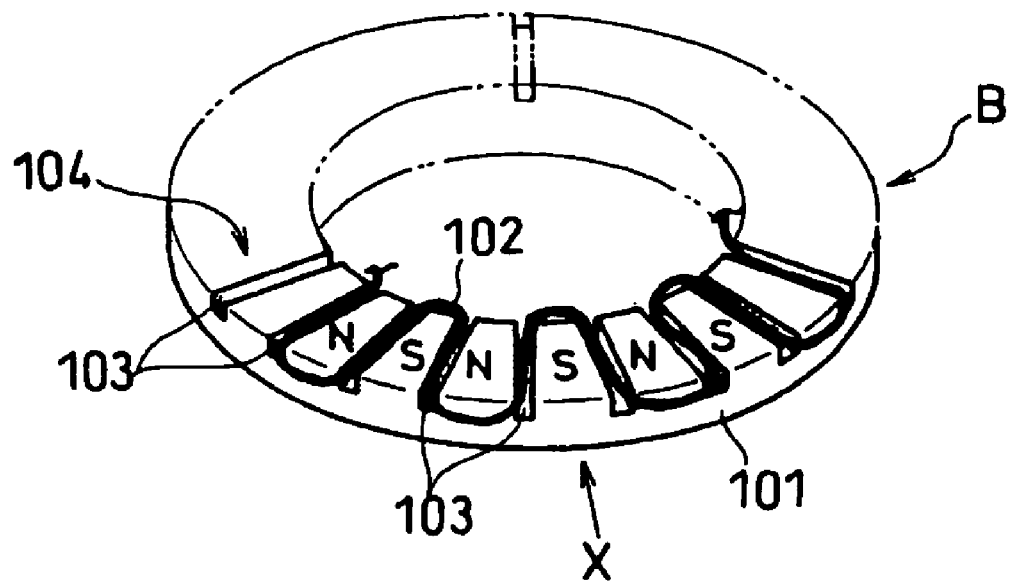
FIG. 13a is a perspective view of a magnetizing yoke of the prior art and FIG. 13b is its partial section.
Figure 13B:
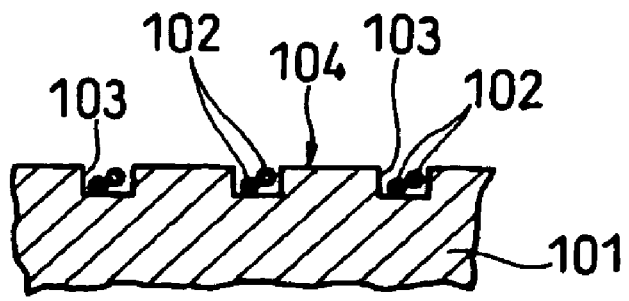
Figure 14:
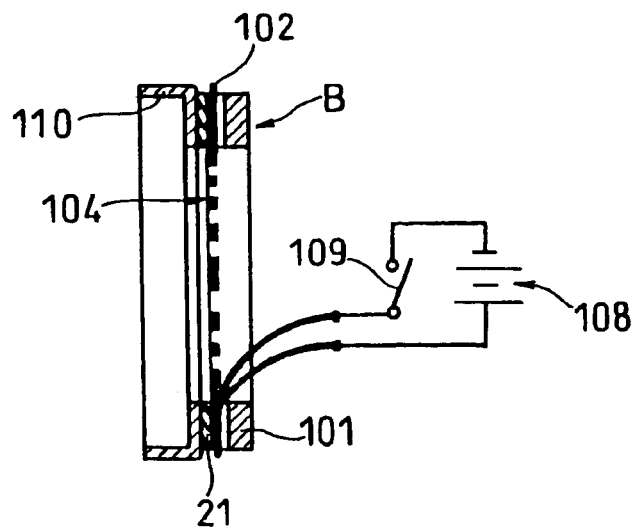
FIG. 14 shows a principle of a magnetizing apparatus for tone wheel according to the prior art.
Figure 15:
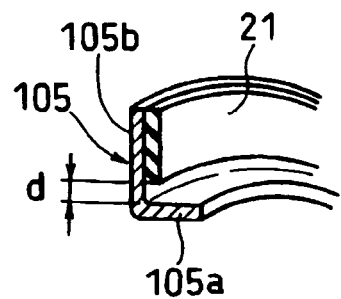
FIG. 15 is a perspective section showing the shape of a seal ring at a rotary side according to the prior art.

As shown in FIG. 12, the magnetizing apparatus A for tone wheel may have a bent groove 30 comprised of a diameter groove 30a formed on the ring-like plane 35 (also the first magnetizing face T1) of the magnetizing yoke 31 and a cross groove 30c formed on the peripheral face 37 (also the second magnetizing face T2). In this case, the tone wheel 21 has an L-shaped section attached to the core material 20 with an L-shaped section and both of two faces like a fitting tubular portion 21k and a ring-like portion 21r can be magnetized at the same time.

Figure 18:
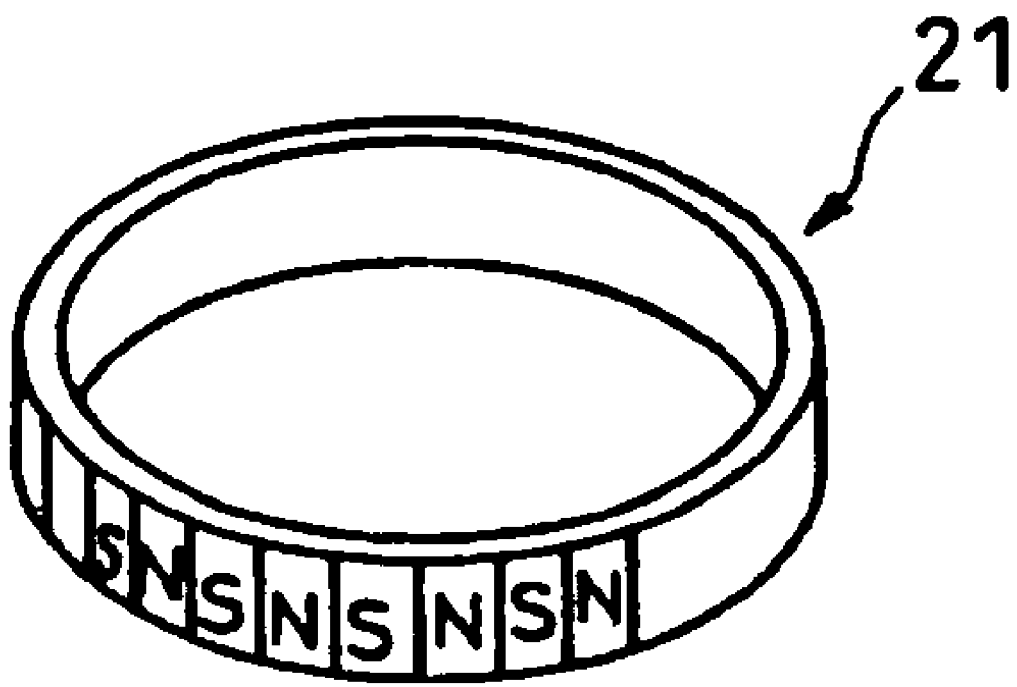
FIG. 18 is a perspective view of a tubular tone wheel.

The present invention can be suitably applied to the magnetizing apparatus for magnetizing the tubular tone wheel 21 as shown in FIG. 18.

What is claimed is:

1. A magnetizing apparatus for tone wheel, comprising a ring-like magnetizing yoke provided with plural wire inserting grooves at a space in its radial direction, and a wire fixed to said magnetizing yoke by sequentially inserting in said grooves, said wire being inserted into each of said grooves adjacent in a manner that it is disposed by turn in and out side of said yoke, wherein
   said groove is formed as a bent groove comprised of a first groove provided on a ring-like plane of said magnetizing yoke in its radial direction and of a second groove communicating with said first groove and formed on the peripheral face of said magnetizing yoke.

2. The magnetizing apparatus for tone wheel as set forth in claim 1, wherein said wire is fixed in zigzag to said first groove and said second groove, and wherein a magnetizing face formed between each of said grooves adjacent is formed of two faces; a part of said ring-like plane and a part of said peripheral face.

3. The magnetizing apparatus for tone wheel as set forth in claim 1, wherein the angle of said ring-like plane relative to said peripheral face is substantially right.

4. The magnetizing apparatus for tone wheel as set forth in claim 1, wherein the angle of said ring-like plane relative to said peripheral face is substantially obtuse.

* * * * *